US011277274B2

(12) United States Patent
Moyal et al.

(10) Patent No.: US 11,277,274 B2
(45) Date of Patent: *Mar. 15, 2022

(54) DEVICE RANKING FOR SECURE COLLABORATION

(71) Applicant: International Business Machines Corporation, Armonk, NY (US)

(72) Inventors: Shailendra Moyal, Pune (IN); Akash U. Dhoot, Pune (IN); Nitin S. Jadhav, Pune (IN)

(73) Assignee: International Business Machines Corporation, Armonk, NY (US)

(*) Notice: Subject to any disclaimer, the term of this patent is extended or adjusted under 35 U.S.C. 154(b) by 328 days.

This patent is subject to a terminal disclaimer.

(21) Appl. No.: 15/730,775

(22) Filed: Oct. 12, 2017

(65) Prior Publication Data

US 2019/0116055 A1 Apr. 18, 2019

(51) Int. Cl.
*H04L 12/18* (2006.01)
*G06F 21/62* (2013.01)
(Continued)

(52) U.S. Cl.
CPC .......... *H04L 12/1818* (2013.01); *G06F 21/62* (2013.01); *H04L 12/1827* (2013.01); *G06F 21/44* (2013.01); *H04L 47/70* (2013.01)

(58) Field of Classification Search
CPC . H04L 12/1818; H04L 12/1827; H04L 47/70; G06F 21/62; G06F 21/44
(Continued)

(56) References Cited

U.S. PATENT DOCUMENTS 8,175,645 B2 * 5/2012 Evans ............... H04M 1/72448
455/557
8,676,908 B2 * 3/2014 Paul ................... G06Q 30/0226
709/206
(Continued)

OTHER PUBLICATIONS

IBM Appendix P, list of patents and applications treated as related, filed herewith, 2 pages.
(Continued)

*Primary Examiner* — Kevin T Bates
*Assistant Examiner* — Nazia Naoreen
(74) *Attorney, Agent, or Firm* — Stephen R. Yoder; William H. Hartwell

(57) ABSTRACT

A computer implemented method for ranking devices according to compatibility with a collaboration service includes receiving a set of collaboration information and a set of device information, wherein the collaboration information includes a service through which the collaboration is available and the set of device information corresponds to one or more registered devices, determining contextual information corresponding to the collaboration, wherein the contextual information includes minimum device requirements for participation in the collaboration, calculating compatibility metrics for one or more participant devices according to the received set of device information and the determined contextual information corresponding to the collaboration, ranking the one or more registered devices according to the calculated compatibility metrics, and enabling a device to access the collaboration according to the device rankings.

13 Claims, 3 Drawing Sheets

(51) Int. Cl.
*H04L 47/70* (2022.01)
*G06F 21/44* (2013.01)

(58) Field of Classification Search
USPC .......................................................... 709/204
See application file for complete search history.

(56) References Cited

U.S. PATENT DOCUMENTS

| | | | |
|---|---|---|---|
| 8,769,032 B2 * | 7/2014 | Ginevan | H04L 12/145 |
| | | | 709/204 |
| 9,271,111 B2 | 2/2016 | Blanksteen | |
| 9,661,269 B2 | 5/2017 | Le Devehat et al. | |
| 2010/0228825 A1 * | 9/2010 | Hegde | G06Q 10/109 |
| | | | 709/204 |
| 2017/0070513 A1 | 3/2017 | Robertson et al. | |

OTHER PUBLICATIONS

Moyal et al., Device Ranking for Secure Collaboration, U.S. Appl. No. 16/409,939, filed May 13, 2019, 23 pages.

* cited by examiner

DEVICE RANKING FOR SECURE COLLABORATION

BACKGROUND OF THE INVENTION

The present invention relates generally to the field of computer networking, and more specifically to ranking devices according to their compatibility with a service.

As technology develops, users connect with networks with a variety of devices, or endpoints. Each such device may have different capabilities, network connection details, security aspects, and applications installed. These devices may be used by an end user to participate in any number of collaborative services. In some cases, one user device may be preferable to another for connection to a particular collaborative service.

SUMMARY

As disclosed herein, a computer implemented method for ranking devices according to compatibility with a collaboration service includes receiving a set of collaboration information and a set of device information, wherein the collaboration information includes a service through which the collaboration is available and the set of device information corresponds to one or more registered devices, determining contextual information corresponding to the collaboration, wherein the contextual information includes minimum device requirements for participation in the collaboration, calculating compatibility metrics for one or more participant devices according to the received set of device information and the determined contextual information corresponding to the collaboration, ranking the one or more registered devices according to the calculated compatibility metrics, and enabling a device to access the collaboration according to the device rankings.

DETAILED DESCRIPTION

While techniques exist for testing a current device's capabilities as they relate to system requirements of a collaboration, there exists a need for determining the capabilities of other known user devices as they relate to a collaboration and providing a ranking accordingly. The method and system disclosed herein enable analyzing a set of known user devices according to their compatibilities with a collaboration. The present invention will now be discussed with respect to the Figures.

Figure 1:
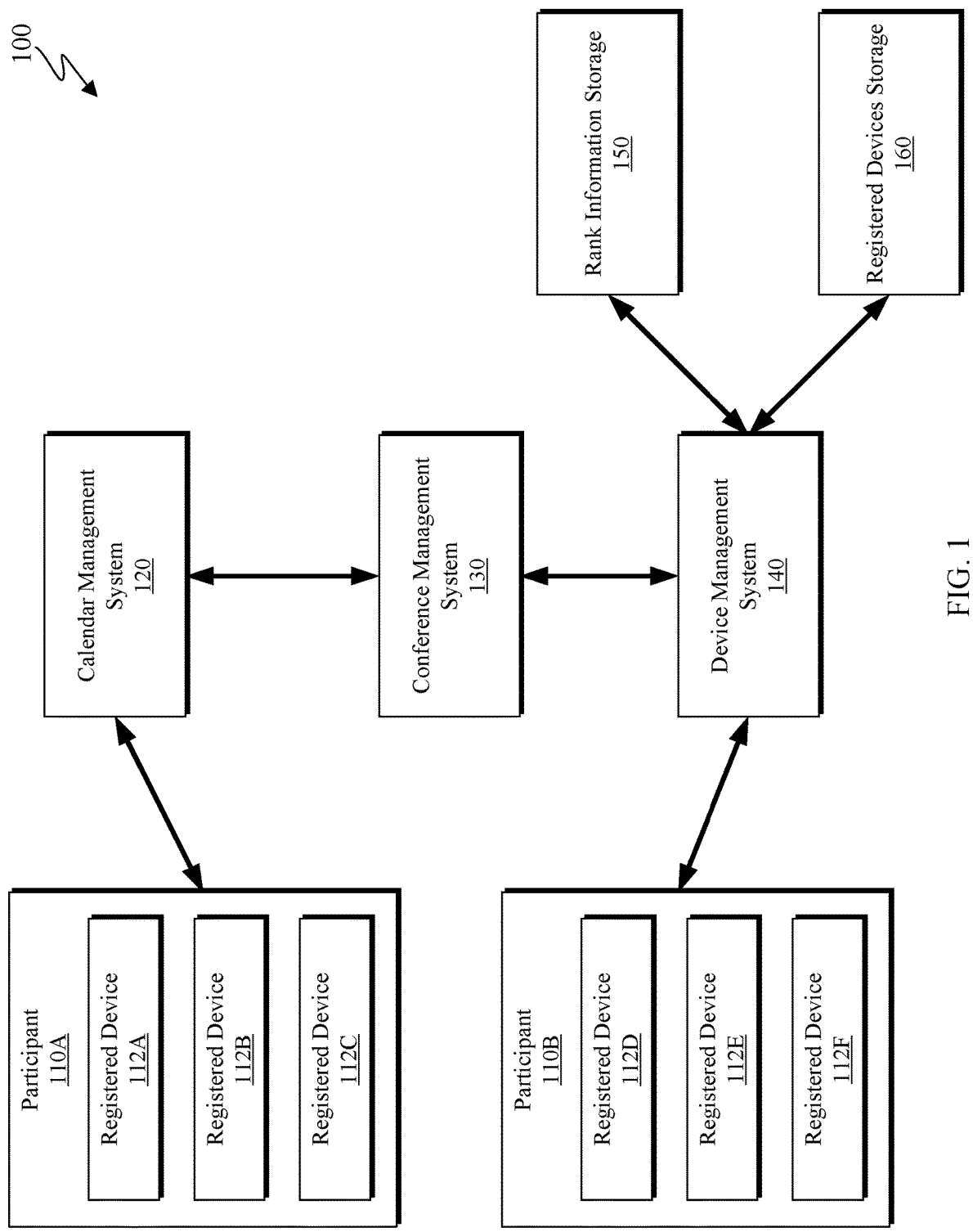
FIG. 1 depicts a block diagram of components of a device ranking system 100 in accordance with at least one embodiment of the present invention.

FIG. 1 depicts a block diagram of components of a device ranking system 100 in accordance with at least one embodiment of the present invention. As depicted, device ranking system 100 includes two participants 110, a calendar management system 120, a conference management system 130, a security context system 140, rank information storage 150, and registered device storage 160. Device ranking system 100 enables analysis and ranking of one or more user devices with respect to a collaboration of interest.

As depicted, each of the two participants 110 has a plurality of registered devices 112. In the depicted embodiment, each participant 110 has 3 registered devices 112, but it should be understood that in other embodiments there may be any number of participants, and each participant may have any number of registered devices. In some embodiments, each registered device 112 corresponds to a device that the participant 110 has registered with the security context system 140. Each registered device 112 may be a desktop computer, laptop computer, specialized computer server, tablet, cellphone, or any other electronic device or combination of electronic devices capable of accessing a collaboration of interest.

Calendar management system 120 may be an online calendar managed or accessed by any participant 110. In some embodiments, calendar management system 120 corresponds to a system that hosts a web application that allows one or more users to edit, and optionally share with other users, online access to a calendar. In some embodiments, calendar management system 120 provides one or more scheduled events to a conference management system. Calendar management system 120 may additionally provide event details for the one or more scheduled events, such as listed participants, scheduling information, location information, or event details. In some embodiments, calendar management system 120 provides one or more scheduled events responsive to receiving a query from either conference management system 130 or device analysis system 140.

Conference management system 130 may be a system or server capable of hosting various collaborative services. Collaborative services may include applications for hosting webinars, webcasts, peer-level web meetings, or any other web-based collaboration applications. In some embodiments, conference management system 130 enables real-time point-to-point communications as well as multicast communications from one sender to many receivers. Conference management system 130 may additionally offer data streams of text-based messages, voice and video chat to be shared simultaneously, across geographically dispersed locations. With respect to the depicted embodiment, conference management system 130 is configured to receive event information from calendar management system 120. Based on the event information, conference management system 130 identifies one or more system requirements corresponding to the event. Additionally, conference management system 130 may be configured to identify one or more system features which may impact event performance. For example, for a video conference, conference management system 130 may determine that a webcam or other camera is required. Additionally, conference management system may identify a minimum network connection strength, as well as identifying network connection strength as a feature that may impact event performance.

Device management system 140 can be a desktop computer, laptop computer, specialized computer server, or any other computer system known in the art. In some embodiments, device management system 140 represents a computer system utilizing clustered computers and components to act as a single pool of seamless resources. In general, device management system 140 is representative of any electronic device, or combinations of electronic devices, capable of executing machine-readable program instructions, as described in greater detail with regard to FIG. 3.

With respect to the depicted embodiment, device management system 140 may receive event information from a conference management system. Additionally, device management system 140 may receive one or more system requirements from conference management system 130 as well as one or more features that may impact event performance. Device management system 140 may additionally be configured to receive device information from either participants 110, devices 112, or conference management system 130. Device management system 140 may be configured to execute a device analysis method to provide device rankings corresponding to an event. One example of a device analysis method is discussed with respect to FIG. 2.

Rank information storage 150 may be any non-volatile storage media known in the art. For example, rank information storage 150 can be implemented with a tape library, optical library, one or more independent hard disk drives, or multiple hard disk drives in a redundant array of independent disks (RAID). Similarly, data in rank information storage 150 may conform to any suitable storage architecture known in the art, such as a file, a relational database, an object-oriented database, and/or one or more tables. With respect to the depicted embodiment, rank information storage 150 is configured to receive device rankings from device analysis system 140. Rank information storage 150 may additionally be configured to store a ranking profile or ranking information, wherein a ranking profile indicates one or more criteria according to which devices are ranked.

Registered device storage 160 may be any non-volatile storage media known in the art. For example, registered device storage 160 can be implemented with a tape library, optical library, one or more independent hard disk drives, or multiple hard disk drives in a redundant array of independent disks (RAID). Similarly, data in registered device storage 160 may conform to any suitable storage architecture known in the art, such as a file, a relational database, an object-oriented database, and/or one or more tables. With respect to the depicted embodiment, registered device storage is configured to store received information corresponding to the one or more registered devices 112. While in the depicted embodiment registered device storage 160 and rank information storage 150 are implemented separately, it should be appreciated that rank information and registered device information may be stored together in other embodiments.

Figure 2:
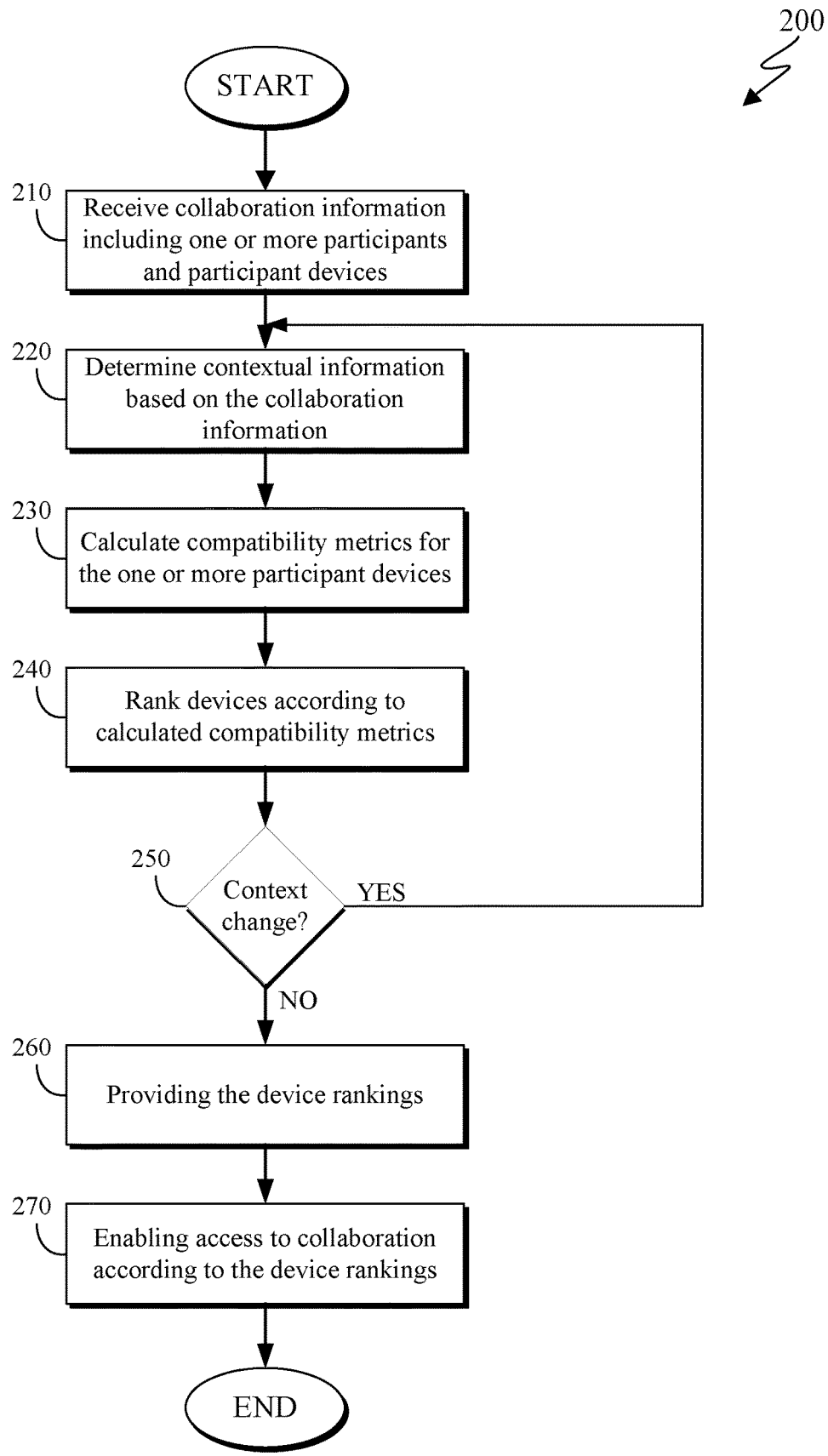
FIG. 2 is a flowchart depicting a bounded liveness extension method in accordance with at least one embodiment of the present invention.

FIG. 2 is a flowchart depicting a device analysis method 200 in accordance with at least one embodiment of the present invention. As depicted, device analysis method 200 includes receiving (210) meeting information and device information, determining (220) contextual information corresponding to the meeting, calculating (230) compatibility metrics for one or more participant devices, ranking (240) according to the calculated compatibility metrics, determining (250) whether a context change has occurred, providing (260) the device rankings, and enabling (270) access to the collaboration according to the device rankings. Device analysis method 200 may enable a user to determine which of his/her devices is the most adequate for accessing a collaboration.

Receiving (210) meeting information and device information may include receiving a list of participants for a collaboration of interest, as well as scheduling information for said collaboration. In some embodiments, receiving (210) meeting information includes receiving device information corresponding to one or more registered devices for each of the participants. Device information may include device type (computer, tablet, phone, etc.), security credentials, device features (webcam, microphone, etc.), networking capabilities, device owner, or any other characteristic of a device capable of connecting to a collaboration service. In some embodiments, receiving (210) meeting information includes enabling users to register one or more devices.

Determining (220) contextual information corresponding to the collaboration may include identifying one or more device features or capabilities required to effectively participate in the collaboration of interest. In some embodiments, determining (220) contextual information corresponding to the collaboration includes determining minimum system requirements for accessing the collaboration of interest. Additionally, the determined contextual information may include features that are not required but can be used to rank devices further. For example, a collaboration may not indicate a certain image quality corresponding to a device's camera, but a device's camera's image resolution can be used to rank devices. Some contextual information may simply be pass or fail conditions; in other words, the contextual information may indicate features that a device must have to participate in the collaboration. Other features included in the contextual information, as discussed above, may not be required, but can be analyzed to contribute to a device ranking.

Calculating (230) compatibility metrics for one or more participant devices may include determining the compatibility of each registered device with the determined contextual information. In other words, calculating (230) compatibility metrics for a participant device includes analyzing said device with respect to each of the features indicated by the contextual information. For example, if the contextual information indicates that the collaboration of interest is a video conference, the contextual information may indicate a minimum connectivity rating, a camera, and a microphone are required to take part in the collaboration. Additionally, the contextual information may indicate that devices with higher connectivity ratings and higher camera resolutions are ranked higher. With respect to this contextual information, calculating (230) compatibility metrics includes determining whether a participant device meets each of the pass fail conditions. In this example, if a device lacks a camera or microphone, or does not meet the minimum connectivity rating, then the device is flagged as incompatible with the collaboration. Each device that passes each of these conditions is then analyzed according to its camera resolution and connectivity rating. weighted more heavily than others when calculating the total device ranking.

Ranking (240) according to the calculated compatibility metrics may include determining a ranking for the one or more registered devices according to the calculated compatibility metrics. With respect to the example discussed previously, a device with a higher camera resolution will be given a superior ranking, and a device with a higher connectivity rating will be given a higher ranking. In some embodiments, the rankings with respect to the individual features are averaged to provide a total device ranking. Certain features may be weighted more heavily than others. For example, a device's connectivity may be weighted twice as heavily as a devices camera resolution.

Determining (250) whether a context change has occurred may include monitoring whether the collaboration details have changed. Examples of a context change include a change in event type, a change in participants, a change in time, or a change in the associated device requirements. In some embodiments, a collaboration service may be configured to provide an alert any time the collaboration details are updated. If a context change has occurred (250, yes branch), the method continues by returning to calculating (230) compatibility metrics. If a context change has not occurred (250, no branch), the method continues by providing (260) the device rankings.

Providing (260) the device rankings may include providing the determined device rankings to the users of said devices. In one embodiment, providing (260) the device rankings includes displaying only the rankings of devices registered by a particular user to said user. Providing (260) the device rankings may additionally include providing the determined rankings to a storage location. In some embodiments, the device rankings may be stored in the same place as the initial device registration information.

Enabling (270) access to the collaboration according to the device rankings may include granting collaboration access to one or more registered devices according to the determined device rankings. For example, if device rankings are calculated according to some security attribute or feature of the devices, it may be detrimental for a device that falls below the minimum security requirements to have access to the collaboration. Therefore, such a device may be denied access accordingly. In other embodiments, each user may be allowed to access the collaboration via only a single device at a time. In such embodiments, a user may be able to either select any of his/her devices that meet the minimum device requirements, or may be required to use his/her highest ranked device to access the collaboration to facilitate the best collaboration results for all participants.

Figure 3:
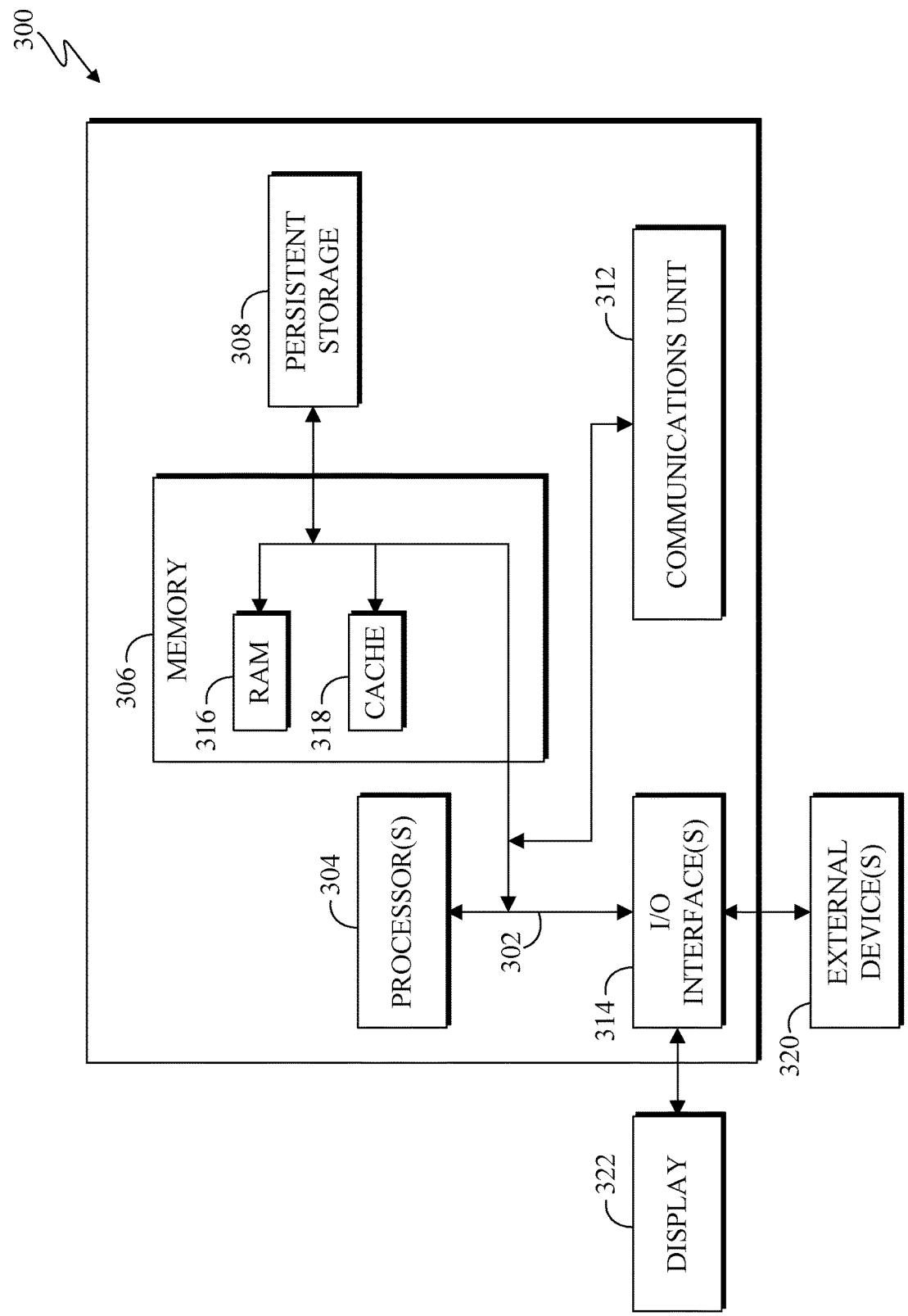
FIG. 3 depicts a block diagram of components of a computer, in accordance with some embodiments of the present invention.

FIG. 3 depicts a block diagram of components of computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 116 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for ranking devices according to compatibility with a service, the computer program product comprising:
    one or more computer readable storage media and program instructions stored on the one or more computer readable storage media, the program instructions comprising instructions to:
    receive a set of collaboration information and a set of device information, wherein the collaboration information includes a service through which the collaboration is available and the set of device information corresponds to one or more registered devices;
    determine contextual information corresponding to the collaboration, wherein the contextual information includes minimum device requirements for participation in the collaboration and optional device features corresponding to the participation;
    calculate compatibility metrics for the one or more registered devices according to the received set of device information and the determined contextual information corresponding to the collaboration;
    rank the one or more registered devices with respect to the collaboration according to the calculated compatibility metrics to identify a preferred device according to the rankings, wherein the preferred device corresponds to the registered device ranked highest; and
    enable the preferred device to access the collaboration according to the device rankings.

2. The computer program product of claim 1, wherein the set of device information includes one or more device features for the one or more registered devices.

3. The computer program product of claim 1, wherein the instructions to rank the one or more registered devices include instructions to aggregate the calculated compatibility metrics for the one or more participant devices and ranking the devices according to the aggregation.

4. The computer program product of claim 1, wherein the instructions to calculate compatibility metrics for a device include instructions to determine whether said device meets one or more minimum device requirements as indicated by the contextual information.

5. The computer program product of claim 1, wherein the instructions to calculate compatibility metrics for a device include instructions to analyze a device with respect to one or more features relevant to the collaboration as indicated by the contextual information.

6. The computer program product of claim 1, the program instructions further comprising instructions to provide the device rankings to one or more users.

7. The computer program product of claim 1, the program instructions further comprising instructions to generate a list of the device rankings.

8. A computer system for ranking devices according to compatibility with a service, the computer program product comprising:
   one or more computer processors;
   one or more computer readable storage media;
   program instructions stored on the one or more computer readable storage media, the program instructions comprising instructions to:
   receive a set of collaboration information and a set of device information, wherein the collaboration information includes a service through which the collaboration is available and the set of device information corresponds to one or more registered devices;
   determine contextual information corresponding to the collaboration, wherein the contextual information includes minimum device requirements for participation in the collaboration and optional device features corresponding to the participation;
   calculate compatibility metrics for the one or more registered devices according to the received set of device information and the determined contextual information corresponding to the collaboration;
   rank the one or more registered devices with respect to the collaboration according to the calculated compatibility metrics to identify a preferred device according to the rankings, wherein the preferred device corresponds to the registered device ranked highest; and
   enable the preferred device to access the collaboration according to the device rankings.

9. The computer system of claim 8, wherein the set of device information includes one or more device features for the one or more registered devices.

10. The computer system of claim 8, wherein the instructions to rank the one or more registered devices includes instructions to aggregate the calculated compatibility metrics for the one or more participant devices and rank the devices according to the aggregation.

11. The computer system of claim 8, wherein the instructions to calculate compatibility metrics for a device include instructions to determine whether said device meets one or more minimum device requirements as indicated by the contextual information.

12. The computer system of claim 8, wherein the instructions to calculate compatibility metrics for a device include instructions to analyze a device with respect to one or more features relevant to the collaboration as indicated by the contextual information.

13. The computer system of claim 8, the program instructions further comprising instructions to provide the device rankings to one or more users.

\* \* \* \* \*